UNITED STATES PATENT OFFICE.

CHARLES DE LA HARPE, OF BASLE, SWITZERLAND, ASSIGNOR TO THE FIRM OF DYE WORKS, FORMERLY L. DURAND, HUGUENIN & CO., OF BASLE, SWITZERLAND.

BLUE DYE AND PROCESS OF MAKING SAME.

SPECIFICATION forming part of Letters Patent No. 707,832, dated August 26, 1902.

Application filed February 27, 1902. Serial No. 95,993. (Specimens.)

*To all whom it may concern:*

Be it known that I, CHARLES DE LA HARPE, chemist, a citizen of the Swiss Republic, and a resident of Basle, Switzerland, have invented new and useful Improvements in the Manufacture of Blue Dyestuffs, of which the following is a full, clear, and exact specification.

In treating the sulfonic gallocyanins obtained by the reaction of a nitrosoalkylbenzylanilinsulfonic acid upon gallic acid or its derivatives—such as gallamic acid, ethers of gallic acid, gallanilide, &c.—by sulfurous acid in a free state or in form of a sulfite or bisulfite derivatives are obtained which are analogous to those of the Letters Patents No. 613,578 of November 1, 1898, No. 638,576 of December 5, 1899, and No. 662,224 of November 20, 1900, but which dye in different shades.

Example: Fifty kilos of the gallocyanin obtained by the reaction of the nitrosoethylbenzylanilinsulfonic acid upon gallamic acid are intimately mixed with a solution of thirty-four kilos of crystallized neutral sodium sulfite in four hundred liters of water. The mass is then heated in a closed vessel on a water-bath during some hours while being well stirred. Thirty kilos of hydrochloric acid of 20° Baumé are then added in order to drive out the uncombined sulfurous acid, whereupon precipitation is effected by common salt. The grayish mass thus obtained is then isolated by filtration and pressed. This coloring-matter is soluble in sodium acetate with a pale-blue color. It dyes chromium-mordanted fibers in blue shades. Its solution in concentrated sulfuric acid is of reddish color, and the coloration of this solution passes over to blue by addition of an oxidizing agent. In this example the gallocyanin resulting from the reaction of the nitrosoethylbenzylanilinsulfonic acid upon gallamic acid may be replaced by any other sulfonic gallocyanin obtained by the reaction of a nitrosoalkylbenzylanilinsulfonic acid upon gallic acid or one of its derivaties—such as gallamic acid, ethers of gallic acid, gallanilide, &c. Likewise the neutral sodium sulfite of this example may be replaced by a bisulfite or the free sulfurous acid, as it has been specified in Letters Patent No. 613,578.

What I claim is—

1. An improvement in the manufacture of blue dyestuffs, consisting in treating a sulfonic gallocyanin derived from a nitrosoalkylbenzylanilinsulfonic acid, by sulfurous acid.

2. An improvement in the manufacture of blue dyestuffs, consisting in treating a sulfonic gallocyanin derived from the nitrosoethylbenzylanilinsulfonic acid by sulfurous acid.

3. As a new article of manufacture, the herein-described blue dyestuff obtained from a gallocyanin derived from a nitrosoalkylbenzylanilinsulfonic acid, the said dyestuff being soluble in sodium acetate with a pale-blue coloration and giving with concentrated sulfuric acid a reddish solution turning to blue by addition of an oxidizing agent, this dyestuff dyeing chromium-mordanted fibers in blue shades.

In witness whereof I have hereunto signed my name, this 13th day of February, 1902, in the presence of two subscribing witnesses.

CHARLES DE LA HARPE.

Witnesses:
  GEO. GIFFORD,
  AMAND RITTER.